United States Patent
Hayashi (10) Patent No.: US 10,211,706 B2
(45) Date of Patent: Feb. 19, 2019

(54) ROTATING ELECTRICAL MACHINE

(71) Applicant: DENSO CORPORATION, Kariya, Aichi-pref. (JP)

(72) Inventor: Jirou Hayashi, Kariya (JP)

(73) Assignee: DENSO CORPORATION, Kariya ( * ) Notice: Subject to any disclaimer, the term of this patent is extended or adjusted under 35 U.S.C. 154(b) by 349 days.

(21) Appl. No.: 15/001,860

(22) Filed: Jan. 20, 2016

(65) Prior Publication Data

US 2016/0218598 A1 Jul. 28, 2016

(30) Foreign Application Priority Data

Jan. 26, 2015 (JP) .................................. 2015-12477

(51) Int. Cl.
| | |
|---|---|
| *H02K 9/22* | (2006.01) |
| *H02K 5/10* | (2006.01) |
| *H02K 5/173* | (2006.01) |
| *H02K 5/22* | (2006.01) |
| *H02K 11/33* | (2016.01) |
| *B62D 5/04* | (2006.01) |

(52) U.S. Cl.
CPC ............. *H02K 9/22* (2013.01); *B62D 5/0406* (2013.01); *H02K 5/10* (2013.01); *H02K 5/1732* (2013.01); *H02K 5/225* (2013.01); *H02K 11/33* (2016.01); *H02K 2213/03* (2013.01)

(58) Field of Classification Search
CPC ....................................................... H02K 9/22
See application file for complete search history.

(56) References Cited

U.S. PATENT DOCUMENTS

| | | | |
|---|---|---|---|
| 2008/0042502 | A1 | 2/2008 | VanLuik et al. |
| 2011/0234028 | A1* | 9/2011 | Iwasaki ................... H02K 9/22 310/52 |
| 2013/0106210 | A1 | 5/2013 | Tsutsui et al. |
| 2013/0257232 | A1 | 10/2013 | Tomizawa et al. |
| 2016/0036299 | A1 | 2/2016 | Hayashi |

FOREIGN PATENT DOCUMENTS

| | | |
|---|---|---|
| JP | 2002-345211 A | 11/2002 |
| JP | 2013-94009 A | 5/2013 |

* cited by examiner

*Primary Examiner* — Ramon M Barrera (57) ABSTRACT

A frame of an electric motor opens in one end. A heat sink, to which a control substrate is connected, closes an opening of the frame. The frame includes a cylinder portion to which a stator is fixed, and a bottom portion that extends inward in the radial direction from the cylinder portion. A rotor is rotatably mounted in the frame to face the stator in the radial direction. A circumferential groove is formed in the bottom portion to face a stator coil in an axis of rotation direction. The circumferential groove is filled with a heat transfer gel. A coil end portion of the stator coil is inserted into the heat transfer gel.

6 Claims, 8 Drawing Sheets

ROTATING ELECTRICAL MACHINE

CROSS REFERENCE TO RELATED APPLICATION

The present application is based on Japanese Patent Application No. 2015-012477 filed on Jan. 26, 2015, disclosure of which is incorporated herein by reference.

TECHNICAL FIELD

The present disclosure relates to a rotating electrical machine that generates electricity by rotating a rotor, or that rotates a rotor when supplied with electric power.

BACKGROUND

Conventionally, rotating electrical machines include a stator fixed to the inner circumferential surface of a motor housing, and a rotor rotatably attached to the motor housing so as to face the stator in the radial direction (see, for example, JP 2013-207968 A). Such a conventional rotating electrical machine may function as an electrical motor in which external electric power is supplied to rotate the rotor, or function as a generator in which the stator generates electric power due to the rotor rotating.

SUMMARY

In rotating electrical machines, there are concerns regarding heat generated due to core losses in the stator core and heat generated due to winding losses in the stator coil. In the rotating electrical machine of JP 2013-207968 A, the stator core is fixed to housing, and heat generated at the stator is typically dissipated to the outside through the housing. Accordingly, both the stator core and the stator coil dissipate heat through the contract region between the housing the stator core. As a result, the heat dissipation performance of the stator is limited. In order to improve heat dissipation performance through the housing, it is necessary to increase the contact surface area between the housing and the stator core. However, there are concerns regarding compatibility with the layout space of the rotating electrical machine and with the design of the rotating electrical machine itself.

In view of the above point, it is an object of the present disclosure to provide a rotating electrical machine with a simple configuration and with superior cooling performance for the stator.

In view of the above, according to the present disclosure there is provided a rotating electrical machine that includes a housing having at least one end in an axis of rotation direction that is open, the housing being cylindrical, a stator that includes a core and a stator coil, the core being fixed to an inner circumferential surface of the housing and the stator coil being wound around the core, and a rotor rotatably mounted in the housing to face the stator in a radial direction. The housing includes a cylinder portion, the stator being mounted to the cylinder portion, and a bottom portion connected to an other end of the cylinder portion in the axis of rotation direction, the bottom portion extending inward in the radial direction, and the bottom portion includes a groove portion formed to face the stator coil in the axis of rotation direction, and a gel material that is thermally conductive and that is filled in the groove portion, the stator coil being inserted into the gel material.

According to this configuration, the bottom portion of the housing includes the groove portion and the thermally conductive gel material. The groove portion is formed to face the stator coil in the axis of rotation direction, and is filled with the gel material. The stator coil is inserted into the gel material. As a result, heat generated at the stator coil may be transmitted through both the gel material and the core to the housing. Accordingly, even without increasing the contact area between the housing and the core, heat dissipation by the stator coil through the housing may be improved with a simple structure. Further, the heat transmitted from the stator coil to the housing through the gel material may also be dissipated through the bottom portion. For this reason, the heat transmitted from the stator coil to the housing may be dissipated by both the cylinder portion and the bottom portion. As a result, heat dissipation by the stator coil is increased, and cooling of the stator may be improved.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION (Configuration of Electric Power Steering Device)

Figure 1:
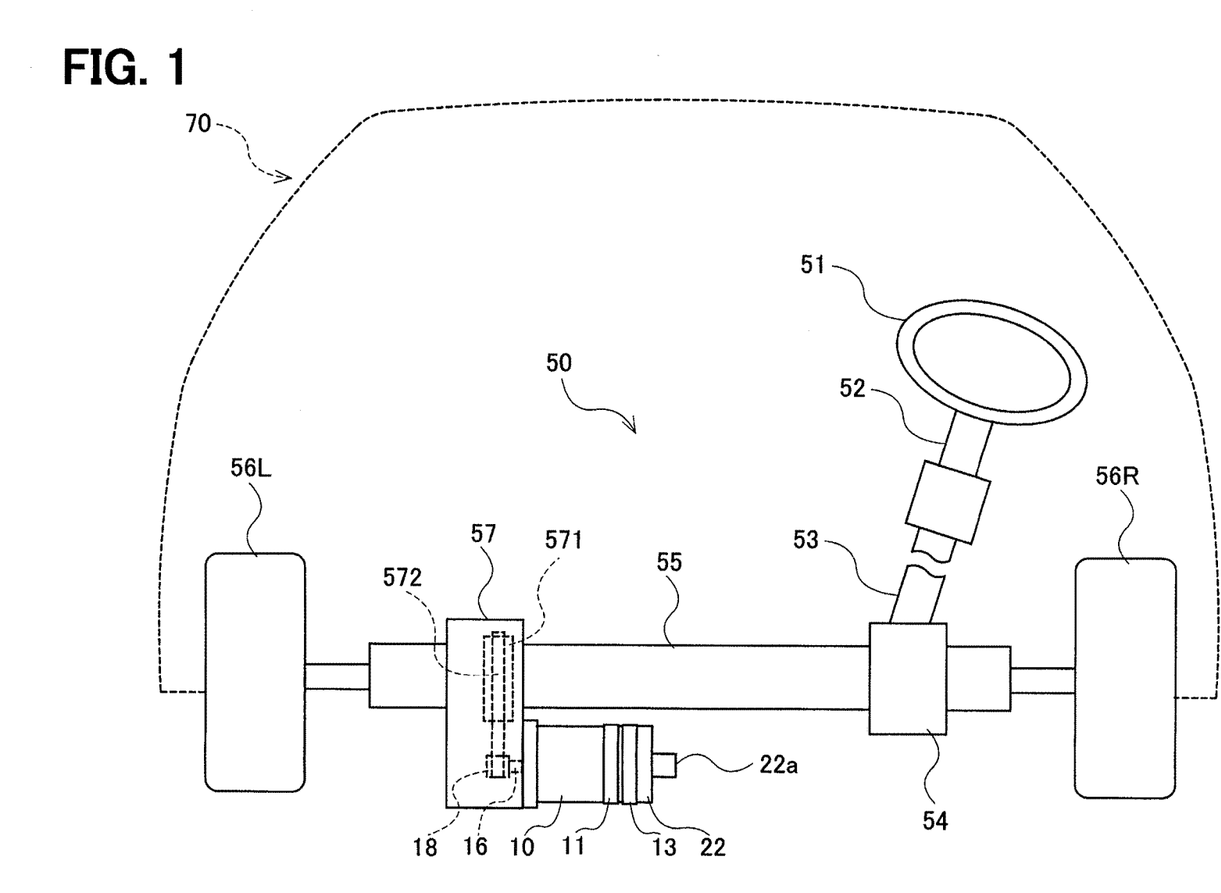
FIG. 1 is a simplified view of an electric power steering device mounted on a vehicle.

An electric power steering device 50 that includes an electric motor 10 (corresponding to a rotating electrical machine) according to a first embodiment of the present disclosure will be explained with reference to FIG. 1. As shown in FIG. 1, the electric power steering device 50 is mounted in a vehicle 70, and includes a steering wheel 51 that is rotatably operated by a driver. A steering shaft 52 connects the steering wheel 51 to an intermediate shaft 53. The intermediate shaft 53 is connected through a rack and pinion mechanism 54 to a rack shaft 55. The two ends of the rack shaft 55 are connected to a pair of steered wheels 56R, 56L (corresponding to wheels of a vehicle).

Accordingly, when the steering wheel 51 is rotatably operated, the rotation motion is transmitted through the steering shaft 52 and the intermediate shaft 53, and this rotation motion is converted by the rack and pinion mechanism 54 into a linear motion of the rack shaft 55 in an axial direction. As the rack shaft 55 moves in the axial direction, the steered wheels 56R, 56L are steered by an angle commensurate with the operation amount applied to the steering wheel 51.

The rack shaft 55 is connected to an electric motor 10 through a power transmission device 57 (corresponding to a decelerator). Specifically, the rack shaft 55 is engaged to a driven-side pulley 571 included in the power transmission device 57. The driven-side pulley 571 is rotatable with respect to the rack shaft 55, and is disposed inside the power transmission device 57 so as to be immovable in the axis of rotation direction (the left-right direction in FIG. 1). The driven-side pulley 571 is connected by a driving belt 572 to a driving-side pulley 18 of the electric motor 10. The outer diameter of the driving-side pulley 18 is configured to be smaller than the outer diameter of the driven-side pulley 571.

According to the above configuration, when the electric motor 10 is driven, rotation of the electric motor 10 is reduced by the driving belt 572 and transmitted to the driven-side pulley 571. Rotation of the driven-side pulley 571 acts as an assist force that causes the rack shaft 55 to linearly move. As a result, the electric motor 10 provides assisting steering force to the steered wheels 56R, 56L through the power transmission device 57.

(Configuration of Electric Motor)

Figure 2:
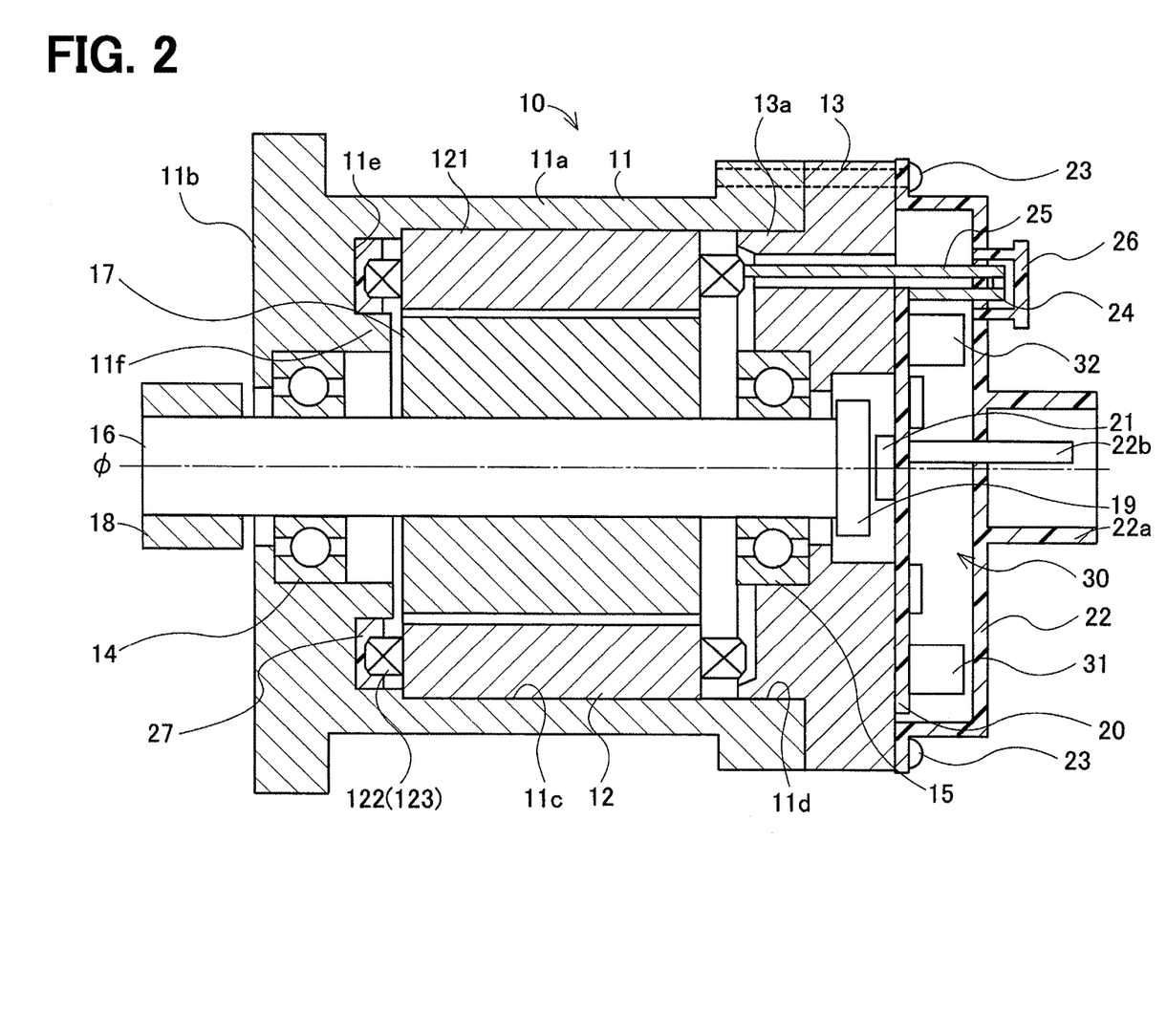
FIG. 2 is a cross sectional view along an axis of rotation of an electric motor according to an embodiment of the present disclosure.

Next, the configuration of the electric motor 10, which is included in the electric power steering device 50, will be explained with reference to FIG. 2. In FIG. 2, the center of rotation of a rotor shaft 16 is shown as an axis of rotation 4). Further, in the below explanation, the direction in which the axis of rotation 4) extends will be simply referred to as the axis of rotation direction. In addition, in the axis of rotation direction, the side closer toward the driving-side pulley 18 (i.e., the left side in FIG. 2) is the rear side of the electric motor 10, while the opposite side (i.e., the right side in FIG. 2) is the front side of the electric motor 10. The front portion of the electric motor 10 corresponds to one end in the axis of rotation direction, while the rear portion of the electric motor 10 corresponds to an other end in the axis of rotation direction. Further, a direction from the outer peripheral of the electric motor 10 toward the rotor shaft 16 will be referred to as radially inward, while the opposite direction will be referred to as radially outward.

As described above, the electric motor 10 of the present embodiment is for assisting steering in the vehicle 70 that the electric power steering device 50 is mounted in. However, the electric motor 10 of the present disclosure is not limited to such a use. The electric motor 10 may be used to drive vehicle devices aside from the electric power steering device 50, to drive general industrial machinery, to drive residential appliances, and such. Further, the electric motor 10 of the present embodiment is formed from a brushless DC motor, but is not limited to this example. The electric motor 10 may be a synchronous motor, an induction motor, or other types of electric motors.

As shown in FIG. 2, the electric motor 10 includes a frame 11 (corresponding to a housing) formed from an aluminum alloy or a resin material with good thermal conductivity. The frame 11 is substantially cylindrical and opens at the front in the axis of rotation direction. The frame 11 includes a cylinder portion 11a and a bottom portion 11b. The bottom portion 11b is connected to the rear end of the cylinder portion 11a in the axis of rotation direction, and extends radially inward. The bottom portion 11b of the frame 11 is attached to the power transmission device 57 included in the electric power steering device 50. Alternatively, the frame 11 may be formed from only the cylinder portion 11a, with the bottom portion 11b being separate. A stator 12 is formed by winding a stator coil 122 on each teeth of a substantially cylindrical stator core 121 (corresponding to a core) formed from a plurality of laminated magnetic steel sheets (a coil end portion 123, which is a portion of the stator coil 122, is also shown in FIG. 2). The stator core 121 is fixed to an inner circumferential surface 11c of the cylinder portion 11a. Specifically, the stator 12 is fixed to the inner circumferential surface 11c by shrink fitting or press fitting.

A heat sink 13 is positioned at the front end of the frame 11 so as to close an opening 11d of the frame 11. The heat sink 13 is formed from an aluminum alloy or another metal material with good heat conductivity such as copper, and has a volume sufficient to dissipate heat generated by a control substrate 20 which will be explained later. The heat sink 13 includes a rear end portion 13a which is inserted from the opening 11d into the inside of the frame 11, and the rear end portion 13a is fitted with the inner circumferential surface 11c. An adhesive is filled in between the heat sink 13 and the frame 11, thereby forming a liquid-tight seal between the inside and the outside of the electric motor 10.

A rear bearing 14 (corresponding to a first bearing) is mounted at an inner periphery edge of the bottom portion 11b of the frame 11. Further, a front bearing 15 (corresponding to a second bearing) is mounted at an inner periphery portion of the heat sink 13. The rotor shaft 16 (corresponding to a shaft) is rotatably mounted in the frame 11 and the heat sink 13 through the rear bearing 14 and the front bearing 15. The rear bearing 14 and the front bearing 15 are fixed to the frame 11 and the heat sink 13 by press fitting or caulking.

The rotor shaft 16 is press fit and fixed with the rotor 17. As a result, the rotor 17 is rotatably mounted to the frame 11 and the heat sink 13. The rotor 17 is positioned to face the stator 12 in the radial direction with a fixed gap thereinbetween. Here, the rotor 17 is formed by placing a plurality of field pole magnets (not illustrated) within a rotor core of laminated steel sheets. As described below, when the stator coil 122 is supplied with power, a rotating magnetic field is generated. Then, the rotor 17 rotates due to the resulting attraction and repulsion forces.

Further, the driving-side pulley 18 as described previously is fixed to the rear end of the rotor shaft 16. As described previously, the driven-side pulley 571 of the power transmission device 57 is connected to the driving-side pulley 18 through the driving belt 572. Moreover, a sensor magnet 19 is attached to the front end of the rotor shaft 16.

A control substrate 20 is fixed to the front surface of the heat sink 13 by a plurality of screws (not illustrated) such that the control substrate 20 abuts the front surface of the heat sink 13. The control substrate 20 is a printed circuit board formed from epoxy resin. A controller 30 that controls a supply of electric power to the stator 12 is formed on the control substrate 20. As shown in FIG. 2, the controller 30 includes a choke coil 31 and a capacitor 32 formed on the front surface of the control substrate 20. In addition to these elements, an inverter 33 (which will be explained with reference to FIG. 4) and the like is also provided on the control substrate 20. The inverter 33 is formed from a plurality of MOS-FETs (metal-oxide-semiconductor field effector transistor). Heat generated by each of these heat generating elements on the control substrate 20 is dissipated by the heat sink 13.

A rotation angle sensor 21 is attached to the rear surface of the control substrate 20 so as to face the previously described sensor magnet 19. The rotation angle sensor 21 is formed from a magnetic resistive element or a Hall element, and detects a rotation angle of the rotor 17 by sensing changes in the magnetic field generated by the sensor magnet 19.

A motor cover 22 (corresponding to a cover member) is attached to the front end of the heat sink 13 so as to cover the control substrate 20. The motor cover 22 is integrally formed from synthetic resins in a substantially dish shape. A plurality of fastening bolts 23, which penetrate through the motor cover 22 and the heat sink 13, are fastened to the frame 11. As a result, the heat sink 13 and the motor cover 22 are fixed to the frame 11. Adhesives are provided at the joining portions between the motor cover 22 and the front end of the heat sink 13, which forms a liquid-tight seal between the inside and the outside of the electric motor 10. A waterproof connector 22a is formed on the front surface of the motor cover 22. A connector terminal 22b that protrudes frontward from the control substrate 20 is inserted into the waterproof connector 22a.

A connection terminal 24 (corresponding to a terminal and a heat conductive member) protrudes from the control substrate 20 in the axis of rotation direction and penetrates through the motor cover 22. The connection terminal 24 is formed from an electrically conductive metal. In addition, a conductor 25 (corresponding to a heat conductive member) extends from the stator coil 122 in the axis of rotation direction to penetrate through the heat sink 13 and the motor cover 22 in this order. The conductor 25 is formed from an electrically conductive metal such as an aluminum alloy. The end of the connection terminal 24 and the end of the conductor 25 are connected to each other outside of the motor cover 22 by, e.g., welding. As a result, the control substrate 20 is connected to the stator coil 122 through the connection terminal 24 and the conductor 25. Electric power is supplied from the control substrate 20 to the stator coil 122 through the connection terminal 24 and the conductor 25. Further, the connection terminal 24 and the conductor 25 have good heat conductivity. As such, heat generated at the control substrate 20 may be transmitted to the stator coil 122 through the connection terminal 24 and the conductor 25.

A waterproof cap 26 (corresponding to a cap member) is mounted to the motor cover 22. The waterproof cap 26 is integrally formed from a waterproof and vapor-permeable material, such as Gore-Tex®. The waterproof cap 26 covers the ends of the connection terminal 24 and the conductor 25, which are connected to each other. The waterproof cap 26 allows the connection terminal 24 and the conductor 25 to dissipate heat, while maintaining a waterproof seal from the outside. Alternatively, the waterproof cap 26 may be formed as an air vent for dissipating heat as well.

As shown in FIG. 2, a circumferential groove 11e (corresponding to a groove portion) is formed in the bottom portion 11b of the frame 11. The circumferential groove 11e has a fixed depth in the axis of rotation direction, and is formed in a circular shape with a center on the axis of rotation. Further, the circumferential groove 11e faces the coil end portion 123 of the stator coil 122 in the axis of rotation direction. The circumferential groove 11e is filled with a heat transfer gel 27 (corresponding to a thermally conductive gel material). The heat transfer gel 27 has good thermal conductivity (having thermal conductivity of at least a predetermined value), and is a gel material where a filler material such as aluminum is included in a silicon based resin material. In addition, the heat transfer gel 27 is an electrical insulator. The coil end portion 123 of the stator coil 122 is inserted into the heat transfer gel 27 filled in the circumferential groove 11e.

Figure 3:
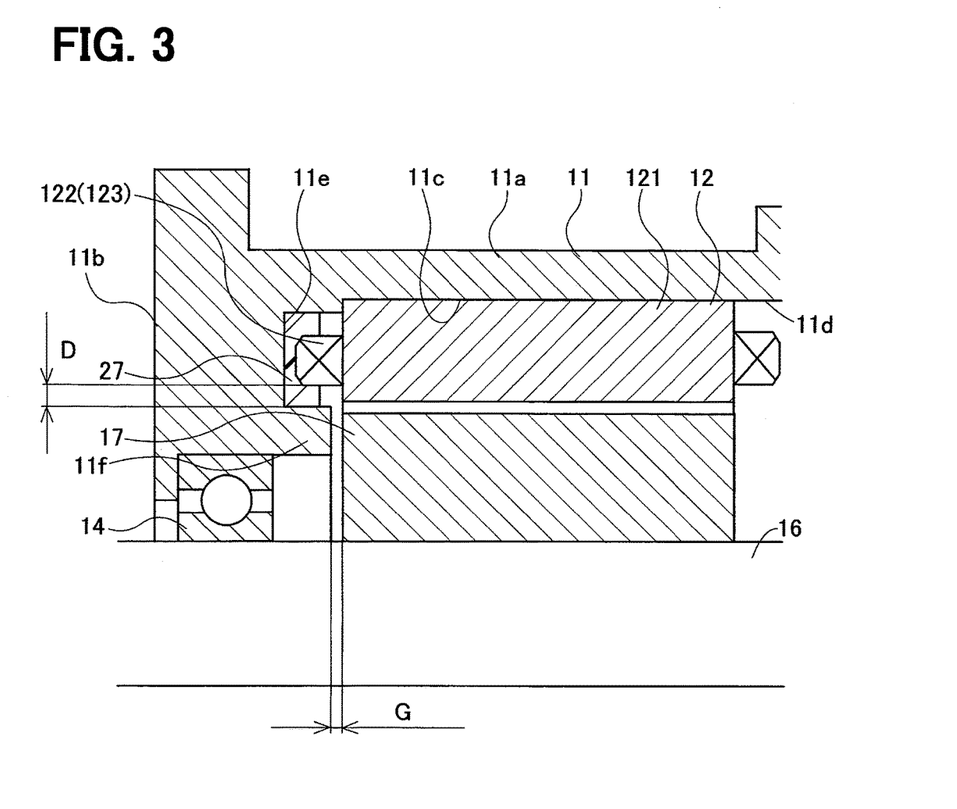
FIG. 3 is an enlarged view of the electric motor shown in FIG. 2.

As shown in FIG. 3, a bottom portion protrusion 11f protrudes, from the frame 11, frontward in the axis of rotation direction. The bottom portion protrusion 11f is positioned inward in the radial direction with respect to the circumferential groove 11e. Further, the bottom portion protrusion 11f overlaps with the coil end portion 123 in the radial direction. A gap G in the axis of rotation direction is defined between the rotor 17 and the bottom portion protrusion 11f of the frame 11. This gap G is set to a minimum value while ensuring that the functionality of the electric motor 10 is not harmed.

Further, the bottom portion protrusion 11f is positioned along the radial direction close to the coil end portion 123, where a gap D in the radial direction is defined between the bottom portion protrusion 11f and the coil end portion 123. This gap D is also set to a minimum value while ensuring that the functionality of the electric motor 10 is not harmed.

(Circuit Configuration of Controller)

Figure 4:
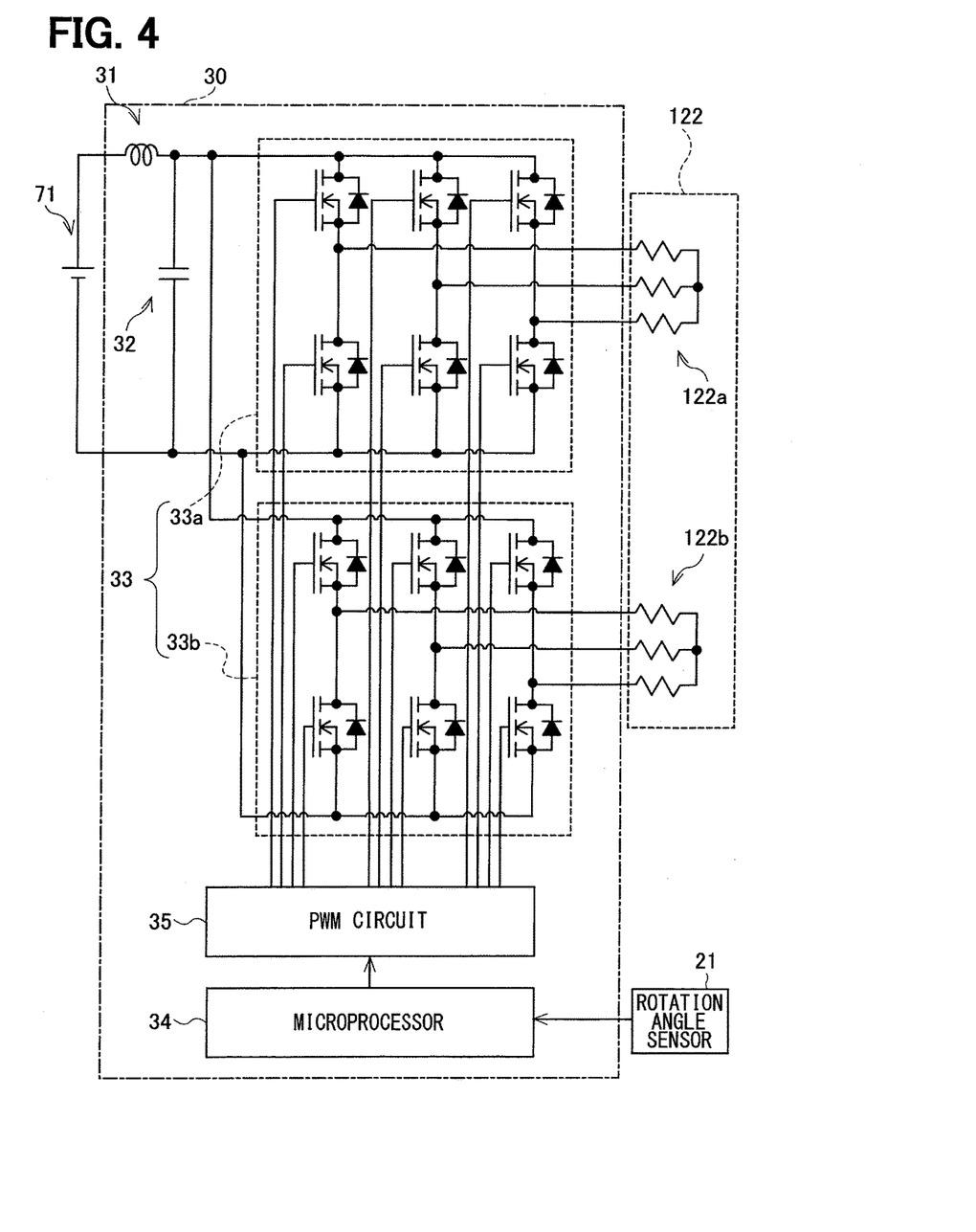
FIG. 4 is a circuit diagram showing a controller of an electric motor.

Next, an explanation of the controller 30 formed on the control substrate 20 will be provided with reference to FIG. 4. A vehicle battery 71 mounted on the vehicle 70 is connected to the choke coil 31 and the capacitor 32 of the controller 30. The choke coil 31 and the capacitor 32 form a filter that reduces noise leaking into the controller 30 as well as noise leaking out from the controller 30. Further, the choke coil 31 smoothes the voltage from the vehicle battery 71, and reduces the pulsations of this voltage.

As shown in FIG. 4, the previously described stator coil 122 may be formed from two sets of three-phase windings 122a, 122b. The inverter 33 includes two systems of inverter circuits 33a, 33b which are connected to the three-phase windings 122a,122b, respectively, in order to supply three-phase AC current to the three-phase windings 122a, 122b.

The rotation angle sensor 21 is connected to a microprocessor 34 included in the controller 30. The microprocessor 34 generates a three-phase voltage control signal based on detection values from the rotation angle sensor 21, a torque sensor (not illustrated) of the vehicle 70, and the like. The microprocessor 34 then sends the three-phase voltage control signal to a PWM (pulse width modulation) circuit 35. The PWM circuit 35 generates a PWM signal based on the three-phase voltage control signal, and transmits the PWM signal to the inverter circuits 33a, 33b. Each of the inverter circuits 33a, 33b are switched according to the PWM signal, generates a requested AC voltage, and supplies the AC voltage to the three-phase windings 122a, 122b.

Further, in the configuration of the controller 30 shown in FIG. 4, some electric components may be omitted, and some electric components or circuits which are not illustrated may be added.

(Assembly of Electric Motor)

Next, a simple explanation of a method of assembling the electric motor 10 will be provided with reference to FIGS. 5A to 5D. The following process is followed when assembling the electric motor 10.

Figure 5A:
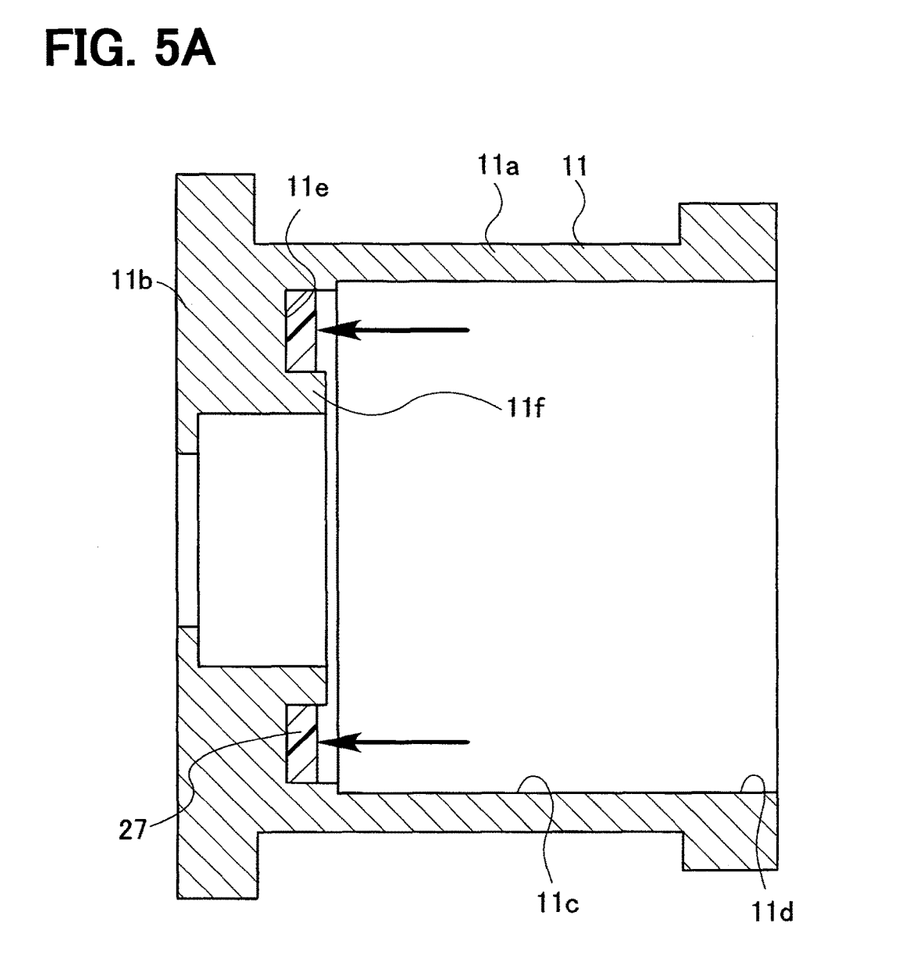
FIG. 5A is a simplified view showing a step of filling a circumferential groove of a frame with a heat transfer gel during an assembly process of an electric motor.

(i) Using a filling device (not illustrated), the circumferential groove 11e is filled the heat transfer gel 27 in liquid form (heat transfer gel filling step: FIG. 5A). The heat transfer gel 27 in the circumferential groove 11e will harden after some time passes.

Figure 5B:
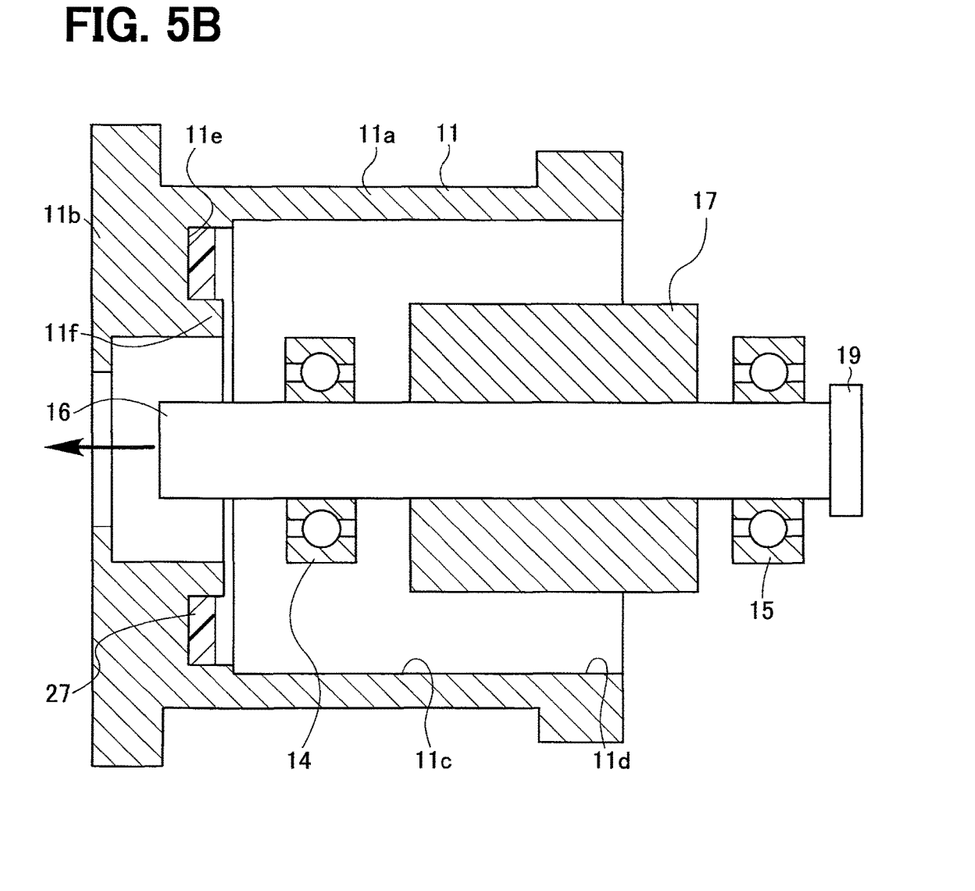
FIG. 5B shows a step of mounting a rotor to a frame.

(ii) The rotor shaft 16, to which the rotor 17 is press fit, is mounted to the frame 11 along with the rear bearing 14 and the front bearing 15 (rotor mounting step: FIG. 5B).

Figure 5C:
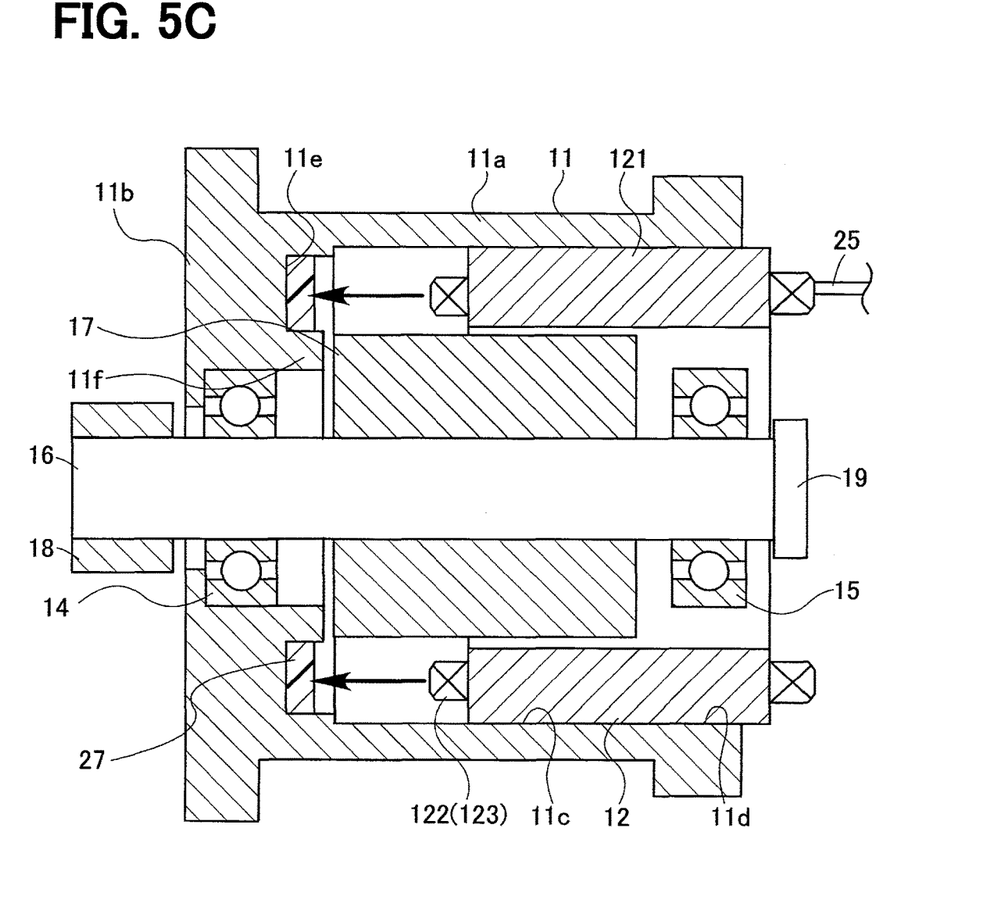
FIG. 5C shows a step of mounting a stator to a frame.

(iii) The stator 12 is fixed to the frame 11 (stator mounting step: FIG. 5C). At this time, before the heat transfer gel 27 hardens, the coil end portion 123 is inserted into the heat transfer gel 27.

Figure 5D:
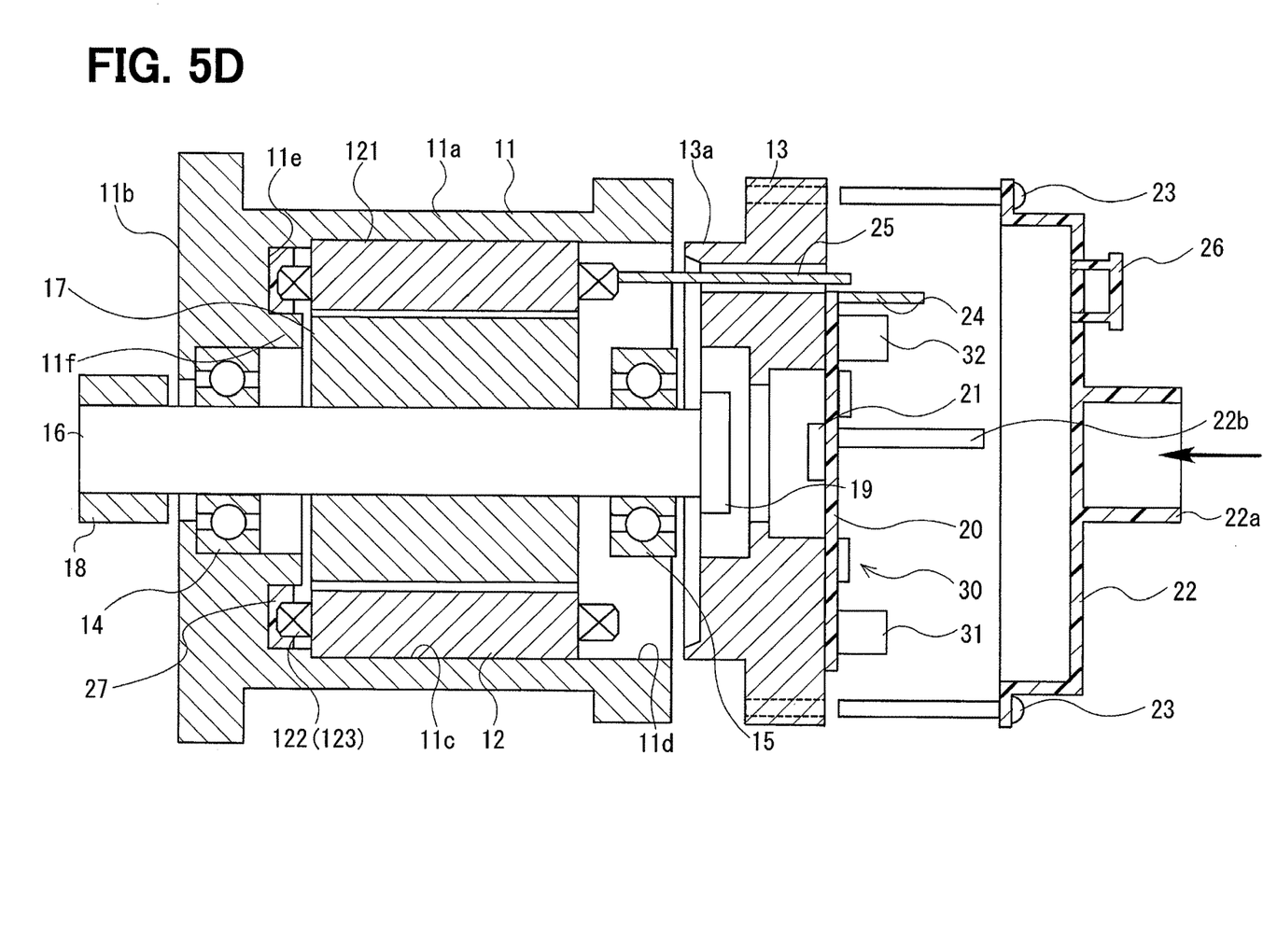
FIG. 5D shows a step of mounting a heat sink and a motor cover to a frame.

(iv) The heat sink 13, to which the control substrate 20 is mounted, is fitted onto the frame 11. Then, the motor cover 22 is placed onto the heat sink 13, and then the fastening bolts 23 are used to attach the heat sink 13 and the motor cover 22 to the frame 11 (heat sink mounting step: FIG. 5D).

Effects of Present Embodiment

According to the present embodiment, the circumferential groove 11e is formed in the bottom portion 11b of the frame 11, and is filled with the heat transfer gel 27. The coil end portion 123 of the stator coil 122 is inserted into the heat transfer gel 27. As a result, heat generated at the stator coil 122 may be transferred to the housing through both the heat transfer gel 27 and the stator core 121. Accordingly, even without increasing the contact area between the frame 11 and the stator core 121, heat dissipation by the stator coil 122 through the frame 11 may be improved with a simple structure. Further, the heat transmitted from the stator coil 122 to the frame 11 through the heat transfer gel 27 may also be dissipated through the bottom portion 11b. For this reason, the heat transmitted from the stator coil 122 to the frame 11 may be dissipated by both the cylinder portion 11a and the bottom portion 11b. As a result, heat dissipation by the stator coil 122 is increased, and cooling of the stator 12 may be improved.

In addition, the heat transfer gel 27 is an insulator. Accordingly, even if the stator coil 122 is, for example, a segment conductor type coil that includes an exposed winding weld portion as the coil end portion 123, insulation of the stator coil 122 may be improved.

In addition, the heat sink 13 and the control substrate 20 are provided. The heat sink 13 is positioned so as to close the opening 11d of the frame 11, and the control substrate 20 is abuttedly mounted to the heat sink 13, the control substrate 20 controlling a supply of electric power to the stator 12. Here, the control substrate 20 is connected to the coil end portion 123 of the stator coil 122 through the connection terminal 24 and the conductor 25 which act as a heat conductive member. As a result, heat generated by the inverter 33 or the like of the control substrate 20 may be transmitted to the stator coil 122 through the connection terminal 24 and the conductor 25. Accordingly, heat generated at the control substrate 20 may be dissipated by both the heat sink 13 and the frame 11.

Further, the electric motor 10 includes the connection terminal 24 and the conductor 25. The connection terminal 24 protrudes from the control substrate 20 in the axis of rotation direction. The conductor 25 extends from the stator coil 122 in the axis of rotation direction. The connection terminal 24 and the conductor 25 penetrate through the motor cover 22, and are connected to each other outside of the motor cover 22. The waterproof cap 26 is mounted on the motor cover 22. The waterproof cap 26 is formed from a waterproof and vapor-permeable material, and covers the connection portion between the connection terminal 24 and the conductor 25. As a result, heat dissipation to the outside by the connection terminal 24 and the conductor 25 may be improved, while a waterproof seal may be maintained.

In addition, the bottom portion protrusion 11f extends in the axis of rotation direction from the frame 11 to overlap with the coil end portion 123 of the stator coil 122 in the radial direction. The bottom portion protrusion 11f is formed to be inward of the circumferential groove 11e in the radial direction. Further, the gap G in the axis of rotation direction between the bottom portion protrusion 11f and the rotor 17 is set to a minimum value while ensuring that the functionality of the electric motor 10 is not harmed. Accordingly, the size of the electric motor 10 in the axis of rotation direction may be minimized.

Further, the bottom portion protrusion 11f is positioned along the radial direction close to the coil end portion 123, where the gap D in the radial direction between the bottom portion protrusion 11f and the coil end portion 123 is also set to a minimum value while ensuring that the functionality of the electric motor 10 is not harmed. Accordingly, the amount of dead space in the frame 11 is reduced, and the size of the electric motor 10 in the radial direction may be minimized. In addition, since the gap D in the radial direction between the bottom portion protrusion 11f and the coil end portion 123 is minimized, heat is transferred from the stator coil 122 to the bottom portion protrusion 11f, and heat dissipation from the stator coil 122 through the frame 11 may be further improved.

Further, the rear bearing 14 is mounted to the inner peripheral edge of the bottom portion 11b of the frame 11, and the front bearing 15 is mounted to the inner peripheral edge of the heat sink 13. The rotor shaft 16, to which the rotor 17 is fixed, is rotatably mounted in the frame 11 and the heat sink 13 through the rear bearing 14 and the front bearing 15. Accordingly, the rotor shaft 16 is retained by the inner peripheral edge of the frame 11 and the inner peripheral edge of the heat sink 13. Here, the stator 12 is mounted to the frame 11, while the heat sink 13 is fitted to the frame 11. As a result, the concentricity of the rotor 17 with respect to the stator 12 may be improved.

It should be noted that when machining the frame 11, the step of forming the inner circumferential surface 11c and the step of forming the engagement portion for the rear bearing 14 may be performed in succession without removing the frame 11 from a chuck. Further, when machining the heat sink 13, the step of forming the engagement portion for the frame 11 and the step of forming the engagement portion for the front bearing 15 may be performed in succession without removing the heat sink 13 from a chuck. As a result, the concentricity of the rotor 17 with respect to the stator 12 may be improved. Further, if the inner circumferential surface 11c and the engagement portion for the rear bearing 14 are simultaneously machined on the frame 11 using a stepped cutter or the like, and if the engagement portion for the frame 11 and the engagement portion for the front bearing 15 are simultaneously machined on the heat sink 13, the concentricity of the rotor 17 with respect to the stator 12 may be further improved.

Further, the front bearing 15 is mounted on the inner periphery of the heat sink 13, and the rear bearing 14 is mounted on the bottom portion 11b of the frame 11. Accordingly, heat generated by the front bearing 15 may be dissipated through the heat sink 13, and heat generated by the rear bearing 14 may be dissipated through the frame 11, thereby improving heat dissipation.

Further, since the front bearing 15 is mounted to the inner periphery of the heat sink 13, it is not necessary to specifically provide a mounting member for the front bearing 15. Accordingly, the electric motor 10 may be miniaturized in the axis of rotation direction, and the number of components in the electric motor 10 may be reduced.

In addition, the electric motor 10 is included in the electric power steering device 50, and provides assisting steering force to the steered wheels 56R, 56L of the vehicle 70. Thus, since the electric motor 10 according to the configuration of the present embodiment may be miniaturized, the electric power steering device 50 may be easily positioned within the narrow spaces around the steered wheels 56R, 56L without sacrificing performance.

In addition, the bottom portion 11b of the frame 11 is mounted to the power transmission device 57 included in the electric power steering device 50. The power transmission device 57 is a structure with at least a fixed size that includes coolant oil, and thus has excellent heat dissipating properties. As a result, heat dissipation by the stator coil 122 through the frame 11 may be further improved.

Other Embodiments

The present disclosure is not limited to the above described embodiments, and a variety of modifications are contemplated.

The descriptions of the present disclosure may be applied to an electric generator that generates electric power at the stator 12 when the rotor 17 rotates.

Further, the descriptions of the present disclosure may be applied to an electric motor/generator that acts as both an electric generator and an electric motor.

The invention claimed is:

1. A rotating electrical machine, comprising:
a housing having at least one end in an axis of rotation direction that is open, the housing being cylindrical;
a stator that includes a core and a stator coil, the core being fixed to an inner circumferential surface of the housing and the stator coil being wound around the core;
a rotor rotatably mounted in the housing to face the stator in a radial direction,
a heat sink disposed to close an opening of the housing;
a control substrate abuttedly mounted to the heat sink, the control substrate controlling a supply of electric power to the stator; and
a heat conductive member that connects the control substrate to the stator coil, wherein
the housing includes
a cylinder portion, the stator being mounted to the cylinder portion, and
a bottom portion connected to an other end of the cylinder portion in the axis of rotation direction, the bottom portion extending inward in the radial direction, and
the bottom portion includes
a groove portion formed to face the stator coil in the axis of rotation direction, and
a gel material that is thermally conductive and that is filled in the groove portion, the stator coil being inserted into the gel material.

2. The rotating electrical machine of claim 1, wherein the gel material is an insulator.

3. The rotating electrical machine of claim 1, further comprising:
a cover member mounted on one end of the heat sink in the axis of rotation direction, the cover member covering the control substrate; and
a cap member formed of a waterproof and vapor-permeable material, the cap member being mounted to the cover member, wherein
the heat conductive member includes
a terminal that protrudes from the control substrate in the axis of rotation direction to penetrate through the cover member, and
a conductor that extends from the stator coil in the axis of rotation direction to penetrate through the cover member, the conductor being connected to the terminal outside of the cover member, and
the cap member covers an end of the terminal and an end of the conductor, the end of the terminal being connected to the end of the conductor.

4. The rotating electrical machine of claim 1, further comprising:
a first bearing mounted at an inner periphery edge of the bottom portion;
a second bearing mounted at an inner periphery portion of the heat sink; and
a shaft rotatably mounted in the housing and the heat sink through the first bearing and the second bearing, the rotor being fixed to the shaft.

5. The rotating electrical machine of claim 1, wherein the bottom portion is mounted to a decelerator of an electric power steering device, and an assisting steering force is provided to wheels of a vehicle through the decelerator.

6. The rotating electrical machine of claim 1, wherein the core is fixed to an inner circumferential surface of the cylinder portion.

* * * * *

UNITED STATES PATENT AND TRADEMARK OFFICE
CERTIFICATE OF CORRECTION

PATENT NO. : 10,211,706 B2
APPLICATION NO. : 15/001860
DATED : February 19, 2019
INVENTOR(S) : Jirou Hayashi

Page 1 of 1

It is certified that error appears in the above-identified patent and that said Letters Patent is hereby corrected as shown below:

On the Title Page

Item [73], after DENSO CORPORATION, delete "Kariya," and insert --Kariya, Aichi-pref. (JP)--, therefore.

Signed and Sealed this
Twenty-ninth Day of October, 2019

Andrei Iancu
*Director of the United States Patent and Trademark Office*